United States Patent [19]

Sisk

[11] Patent Number: 4,822,001
[45] Date of Patent: Apr. 18, 1989

[54] POSITIVE FLUID SEAL BUTTERFLY VALVE

[76] Inventor: David E. Sisk, R.R. 1, Box 340, Bonne Terre, Mo. 63628

[21] Appl. No.: 143,198

[22] Filed: Jan. 13, 1988

[51] Int. Cl.$^4$ ............................................. F16K 1/22
[52] U.S. Cl. .................................... 251/306; 251/305
[58] Field of Search ................................ 251/306, 305

[56] References Cited

U.S. PATENT DOCUMENTS

| 4,014,511 | 3/1977 | Uno | 251/306 |
| 4,227,675 | 10/1980 | Sutter et al. | 251/306 X |
| 4,653,724 | 3/1987 | Garrigues et al. | 251/306 |

Primary Examiner—A. Michael Chambers
Assistant Examiner—John C. Fox
Attorney, Agent, or Firm—Paul M. Denk

[57] ABSTRACT

A butterfly valve for insertion between a pair of spaced flanges in a fluid flow passageway is disclosed as incorporating a tubular body having a pivotally mounted disc valve positioned in the fluid flow passageway for opened and closed positions thereof, and a resilient seal mounted in the tubular body having an inner wall for engaging the disc valve along its outer periphery when the disc valve closes the fluid flow passageway as well as spaced and opposed outer walls which complementarily engage a dovetail extension projecting from within the tubular body, the spaced and opposed outer walls of the resilient seal being separated at least partially from the dovetail extension, and the inner wall and the spaced and opposed outer walls of the resilient seal also being joined along generally right angled corner areas, thereby allowing compression of the resilient seal and lined contact engagement with the spaced pipe flanges along the corner areas thereof to provide a positive seal eliminating contamination problems with different fluid materials transported through the fluid flow passageway.

6 Claims, 2 Drawing Sheets

U.S. Patent    Apr. 18, 1989    Sheet 1 of 2    4,822,001
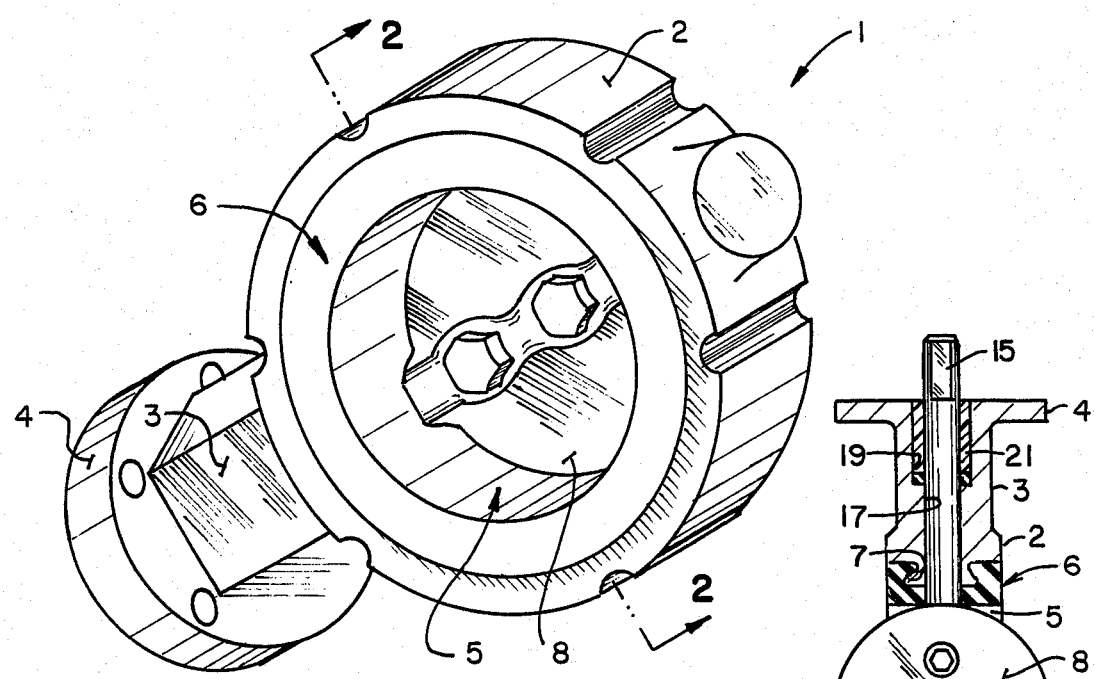
FIG.1.
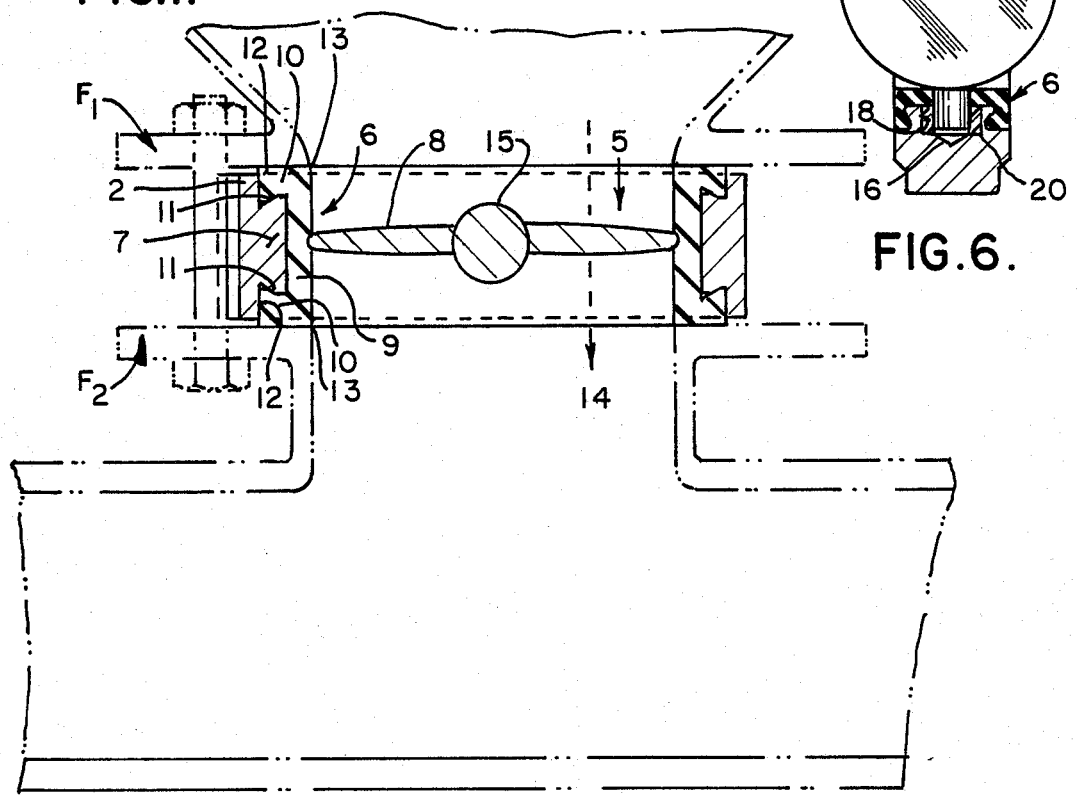
FIG. 2.
FIG. 6.

POSITIVE FLUID SEAL BUTTERFLY VALVE

BACKGROUND OF THE INVENTION

This invention relates generally to a butterfly valve for application within a fluid flow passageway, and more particularly, pertains to a resilient seal for use with butterfly valves which is constructed, arranged and configured relative to the butterfly valve to provide positive line contact sealing with adjoining pipe flanges in a fluid flow passageway so as to totally eliminate contamination problems which have heretofore been caused by trapped product between the seal and the adjoining flanges in prior art designs.

Butterfly or disc valves are frequently used in fluid flow lines where it is desired to load or unload fluid materials for shipment or storage. Such uses include tank trailers for transporting fluids (liquids or granular material) from one location to another, as well as fluid flow lines for loading and unloading barges, ships or other means of transportation and storage. Other uses include various pneumatic or pressure unloadings or conveyances of material which are associated with aeration devices, blowers, dusk collectors and other such devices in flow lines where some control is required.

Since butterfly valves have been used for many years in such aforementioned applications, the prior art is replete with many butterfly valve constructions and designs. The typical butterfly valve customarily uses a pivotally mounted disc-type valve in a flow line which also incorporates a resilient seal against which the disc valve moves to seal off the flow line and when open, to allow fluid materials to be conveyed along the flow line. Examples of such prior art designs includes U.S. Pat. No. 2,740,423 which discloses the typical butterfly valve construction; U.S. Pat. No. 2,994,342 which specifically discloses one type of resilient seal construction; U.S. Pat. No. 3,100,500 which provides a removable seat including seat and stemware-sleeve for the disc valve; U.S. Pat. No. 3,241,806 which discloses a plastic layer overlying a resilient seal and my prior U.S. Pat. No. 4,699,357 which provides opposed bushing mountings for a disc valve stem in a butterfly valve to provide positive disc control during repeated and continuous use.

In each of the aforementioned and other butterfly valve designs of the prior art, there has been a contamination problem when transporting such products as polymer pellets or food grade materials. Specifically, it has been discovered that plastic pellets or food products become trapped between the resilient seal and adjoining pipe flanges. For example, colored plastic pellets from a previous load might have been retained in the aforementioned contamination area and may be dislodged when discharging a load of, for example, white plastic pellets. This problem is caused in that standard butterfly valves have a radius on the edge of the resilient seal or seat. When the resilient seal or seat is compressed against a flange, the radius creates a "V" shaped crevice. The standared "O" ring sealing action of a standard seat further compounds the problem by holding the flange away from the flat edge of the resilient seal or seat. The radius edge on some hopper flange tees magnify the problem, thus providing a crevice in which product is entrapped. Unloading pressure used to unload fluid materials sometimes forces the pellets and powders into this product entrapment crevice, and in some cases, may even embed pellets into the standard resilient seal or seat in this area. It will be apparent that customer dissatisfaction, not to mention that potential for legal exposure due to contaminated product, has created a need for a new and improved design which totally and completely avoids contamination problems.

SUMMARY OF THE INVENTION

Among the several objects and advantages of the present invention include:

The provision of a resilient seal in a butterfly valve assembly which totally and completely avoids contamination problems between the resilient seal and adjoining pipe flanges, such as hopper and tee flanges used in flow lines for transporting fluid materials;

The provision of a resilient seal in a butterfly valve assembly which provides positive line contact or square edge sealing against adjoining pipe flanges for eliminating crevices or recesses where materials can accumulate to contaminate subsequent materials which are transported in fluid flow transportation systems;

The provision of a resilient seal in a butterfly valve assembly which permits ongoing use of different products without necessitating the unbolting the butterfly valve and adjoining pipe flanges to clean the system;

The provision of the aforementioned resilient seal in a butterfly valve assembly which also includes discrete long wearing, low friction and non-corrosive bushings which are located in predisposed counterbores arranged diametrically of the tubular housing containing the butterfly valve, and into which the butterfly or disc valve and its stem may be pivotally mounted for precise turning between opened and closed positions; and The provision of the aforementioned resilient seal in a butterfly valve assembly which is designed for long term usage, resists product embedding or wedging, is capable of providing a tight-fitting seal with the butterfly valve, exhibits superior abrasion resistance, offers a tougher valve seat with excellent tensile strength, exhibits excellent physical properties even at elevated temperatures, and eliminates labor and economic cost associated with prior flange disassembly procedures for cleaning purposes.

These and other objects will become more apparent to those skilled in the art upon reviewing the summary of this invention, and upon undertaking a study of the description of its preferred embodiment in view of the drawings.

Briefly stated, the invention contemplates a butterfly valve that is used in a tubular housing having a fluid flow chamber which communicates with a fluid flow passageway in which fluid flow materials are transported, including liquid and/or granular materials. The butterfly or disc valve is pivotally mounted within the tubular housing to open and close the fluid flow chamber for opened and closed communication with the fluid flow passageway. Surrounding the fluid flow chamber, a resilient seal is provided and includes an inner wall which is configured and dimensioned to engage a disc or butterfly valve or element along its outer periphery when the disc element closes the fluid flow chamber in the tubular body. Integrally connected to the inner wall of the resilient seal and at opposite ends thereof are spaced and opposed walls which have undercut configurations for complementary engagement and retention by a dovetail extension which projects from an inner portion of the tubular housing or body, and which also have an inner wall surface which is spaced from the dovetail extension to define inner recess areas on opposite sides of the dovetail extension. The spaced and opposed outer walls of the resilient seal are further provided with an outer wall surface which extends beyond the tubular body or housing of the butterfly valve in order to engage joining pipe flanges associated with conveying systems in the fluid flow passageway. The spaced and opposed walls and the inner wall of the resilient seal are joined to one another along generally right angled cornered areas, such that upon compression engagement of the outer wall surfaces of the resilient seal by the adjoining pipe flanges, the resilient seal will be compressed and will flow at least partially into the inner recess areas and will also allow the inner wall of the resilient seal to be deflected inwardly for a tighter seal with the disc element when in closed position, while maintaining the generally right angle corner areas for line or flush contact engagement with the adjoining pipe flanges to provide continuity for the fluid flow passageway. Thus, the generally right angled corner areas of the resilient seal engage the adjoining pipe flanges in a compression line or square edge contact engagement as to provide a positive seal which eliminates any openings or crevices therebetween in which heretofore fluid flow products may be entrapped.

Further, the invention contemplates a reinforced industrial butterfly valve which includes long wearing, low friction and non-corrosive bushings which are located in predisposed diametrically opposed counterbores formed in the tubular body or housing containing the butterfly valve, and into which the butterfly or disc valve and its stem may be pivotally mounted for precise turning between opened and closed positions over extended and repeated use, such as shown in my aforementioned U.S. Pat. No. 4,699,357.

BRIEF DESCRIPTION OF THE DRAWINGS

FIG. 1 is an isometric view of a butterfly valve which incorporates a resilient seal which is constructed in accordance with the teachings of the present invention;

FIG. 2 is a sectional view taken along the lines 2—2 in FIG. 1, and further showing in phantom lines a hopper and tee flange associated with the butterfly valve in a fluid flow passageway;

FIG. 6 is a sectional view illustrating the butterfly disc valve and its stem mounting relative to the tubular housing or body thereof.

DESCRIPTION OF THE PREFERRED EMBODIMENT

Figure 3:
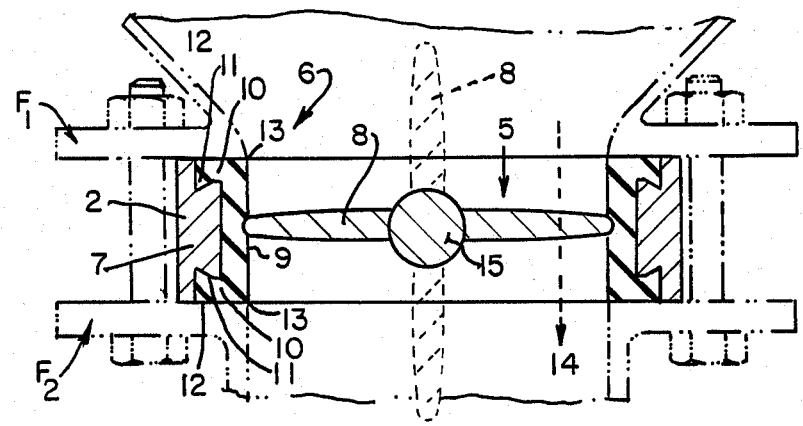
FIG. 3 is a vertical sectional view similar to FIG. 2 which shows the disc valve in a solid line closed position, and a phantom line open position.

In referring to the drawings, it will be seen that the butterfly valve 1 of the present invention is generally disclosed as incorporating a tubular body or housing 2 having an integral upper projecting boss means 3 to provide support for mounting various operating components of the valve, as will be subsequently explained, and which further includes a housing flange 4 upon which handle means [not shown] may be used for either manual or automatic operation of the valve. The tubular housing 2 has a fluid flow chamber 5 therethrough for conveying various types of materials when the butterfly valve is in open condition, as shown in FIG. 3 of the drawings.

As previously explained, the tubular housing 2 with associated butterfly valve may be inserted within any type of flow line used in transporting and unloading fluid materials, including liquid and/or granular products. While the butterfly valve 1 of the present invention may be used in a variety of flow line applications, one particular area of use, where contamination associated with product entrapment has occurred, involves the product transportation and unloading of polymer pellets or food grade materials. A typical environment where butterfly valve assemblies are used is illustrated in the FIG. 5 prior art disclosure. There, it can be seen that the butterfly valve 1x is positioned between a hopper flange F1, shown in dotted lines which is associated with a hopper truck, and tee flange F2, which is also shown in phantom lines as being associated with a flow line unloading system. The butterfly valve 1x is located and positioned between the spaced pipe flanges F1, F2 and secured therebetween as by the threaded fasteners also shown in phantom lines in FIG. 5.

Figure 5:
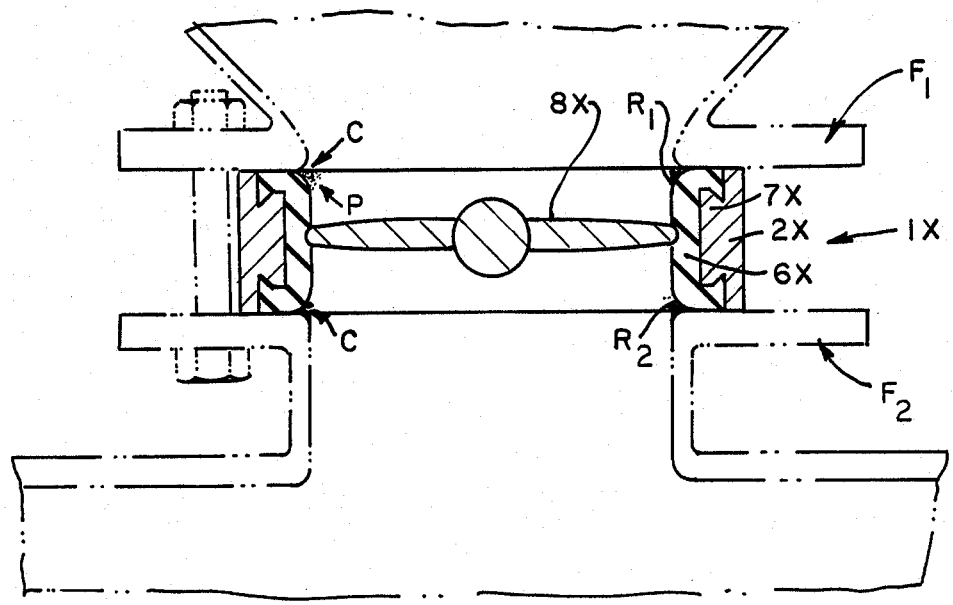
FIG. 5 is a sectional view similar to FIGS. 2 and 3, but which shows the typical resilient seal of prior art constructions which have caused product entrapment and contamination.

The prior art butterfly valve 1x shown in FIG. 5 includes the typical construction of a tubular housing 2x also having a resilient seal 6x complementarily mounted to a dovetail keystone 7x extending from the tubular housing 2x. The disc valve 8x is pivotally mounted within the tubular housing 2x and engages the resilient seal 6x when in closed position as shown in FIG. 5. the resilient seals 6x of the butterfly valves of the prior art, as represented in the FIG. 5 disclosure, have upper and lower radii, R1, R2 respectively positioned and associated relative to the flanges F1, F2 respectively. When the resilient seal 6x is compressed between the flanges F1, F2 as shown in FIG. 5, it will be seen that the radii R1, R2 create a "V" shaped crevice generally identified as at C in FIG. 5 of the drawings. A standard "O" ring sealing action of a standard resilient seal or seat compounds the problem by holding the flanges F1, F2 away from the flat side or wall against which the flanges F1, F2 are positioned. Added to this problem is the fact that the radius edge of some hopper and flange tees designs, as is shown in FIG. 5 of the drawings, create a perfect place for product entrapment by way of wedging within the crevice C. The unloading pressure sometimes forces pellets and powders into this crevice C, even embedding the pellets into the standard soft valve resilient seal or seat. This is illustrated in FIG. 5 of the drawings where plastic pellets or the like are shown by the letter P as being entrapped at spaced locations within the crevice C. Because of customer dissatisfaction and potential product liability problems, hopper truck owners have followed the practice of unbolting the flanges F1, F2 from one another to remove the butterfly valve 1x for cleaning purposes. The time and expense associated with such a continuing procedure is not warranted.

Figure 4:
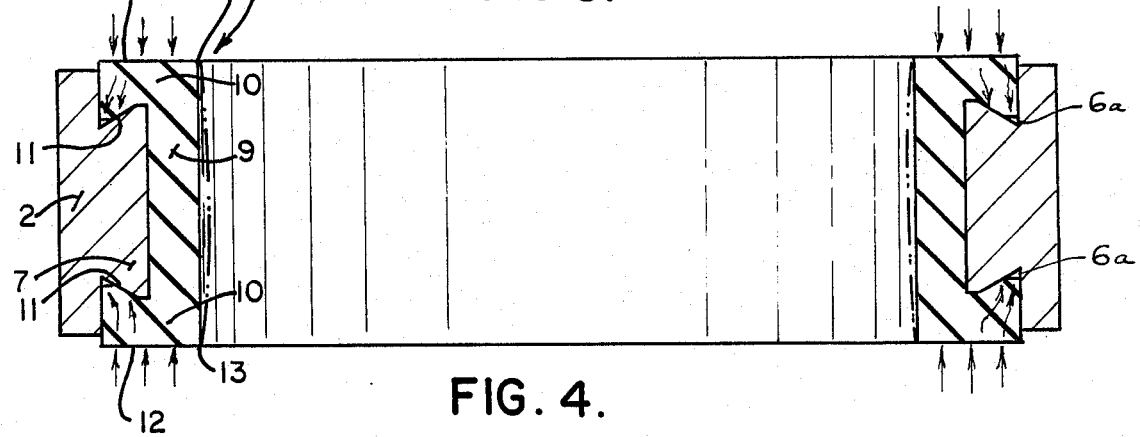
FIG. 4 is an enlarged sectional view showing the resilient seal as being compressively engaged and distorted by representative arrows illustrating such forces.

In accordance with an important feature of the present invention, the resilient seal 6 is provided with a positive line contact or square edge of flush seal with the flanges F1, F2 to eliminate the product entrapment and contamination problems associated with the crevice C of the prior art constructions. More specifically, it will be seen that the resilient seal 6 surrounds the fluid flow chamber 5 of the tubular body 2 and includes an inner wall 9 which is integrally connected and joined to spaced and opposed outer walls 10 which extend from opposite ends of the inner wall 9 in a direction generally transverse thereto. The inner wall 9 of the resilient seal 6, as is seen in FIGS. 2 and 3 of the drawings, is configured and dimensioned to engage and seal the disc or butterfly valve 8 along its outer periphery when the disc element 8 closes the fluid flow chamber in the tubular body 2. As in prior art constructions, the spaced and opposed wall 10 of the resilient seal 6 are also provided with undercut configurations, as illustrated, for complementary engagement and retention by the dovetail extension or keystone 7 which projects from an inner portion of the tubular body 2. The spaced and opposed outer walls 10 of the resilient seal 6 are also each provided with an inner wall surface 11 which is at least partially spaced from the dovetail extension 7 to define inner recess areas, as at 6a, on opposite sides of the dovetail extension 7, as best shown in FIG. 4 of the drawings. These inner recess areas, separating the inner walls 11 from the dovetail extension, are preferably provided at least in the deepest undercut portion of the dovetail extension 7, and may also be provided in other portions of the inner wall surfaces 11, 11, as may be desired. The spaced and opposed outer walls 10, 10 of the resilient seal 6 are further provided with outer wall surfaces 12, 12 respectively which extends beyond the tubular body 2 of the butterfly valve 1 for engagement with the spaced pair of pipe flanges F1, F2 as shown in FIGS. 2-3 of the drawings. Note further that the spaced and opposed walls 10, 10 and the inner wall 9 of the resilient seal 6 are integrally joined and connected to one another along generally right angled corner areas 13, which are preferably formed in sharp, right angled corner sections, for purposes now to be described.

With a resilient seal 6 constructed in the aforementioned manner, pipe flanges F1, F2 clamp the butterfly valve 1 and the resilient seal 6 in the position shown in FIGS. 2 and 3 of the drawings, to allow the fluid flow chamber 5 to communicate in a flow line passageway generally represented by the numeral 14, as the butterfly valve 8 is moved to its open position as represented by the phantom lines shown in FIG. 3 of the drawings. When the flanges F1 and F2 mount the butterfly valve 1 therebetween, the resilient seal 6 will be subject to compressive force distortion as represented by the arrows shown in FIG. 4 of the drawings. Hence, the outer wall surface 12, 12 of the spaced and opposed outer walls 10, which extend outwardly beyond the tubular body to the flanges F1, F2, will have a compressive force exerted thereon as represented by the vertical extended onwardly and upwardly indicated arrows shown in FIG. 4. Thus, the resilient seal will flow and deform at least partially into the inner recess areas 6a bringing the inner wall surfaces 11, 11 closer to the dovetail extension 7, while the inner wall 9 of the resilient seal is deflected inwardly, as shown, in phantom line, in order to provide a tighter seal with the disc element 8 when moved to its closed position. It will be noted, however, that even with the compression and distortion/deflection of the resilient seal as described above, the right angled corner areas 13 will be generally maintained in their initially formed construction. As a result, the corner areas 13, 13 will engage the pipe flanges F1, F2 in a compression line contact or square edge engagement to provide a positive seal eliminating any openings or crevices therebetween, as can be seen in their preferred functioning in FIGS. 2 and 3 of the drawings. The right angled corner areas 13, 13 will aggressively impinge upon the inner walls of the flanges F1, F2 as a result of the compressed resilient urging of the resilient seal 6, when placed under compression, as will be understood. The problems associated with the crevices C in the FIG. 5 prior art disclosure are thereby avoided, along with all the aforementioned attendant and related problems.

As shown in connection with FIG. 6 and as described in our aforementioned U.S. Pat. No. 4,699,357, the butterfly valve 18 incorporates a pivot stem 15 which supports the valve for pivotal movement between open and closed positions. Pivot mounts in the form diametrically opposed apertures 16, 17 formed in the housing 2 are each associated with counterbores 18, 19 respectively into which bushings 20, 21 are located for pivotally mounting the stem 15 of the butterfly valve 8. In order to facilitate assembly of the stem within the bushings and counterbores above described, the lower aperture 16 opens interiorally of the tubular housing and is an open communication with the flow chamber, while the other aperture 17 opens exteriorally of the tubular housing, for assembly of the components as is described in greater detail in our aforementioned patent. Each bushing 20, 21 comprises an annulus which is formed from a polymer that provides long wearing, low friction while also being corrosion resistant. The preferred polymer is also described in greater detail in our aforementioned patent. In view of the above, it will be seen that the aforementioned and other objects of this invention are achieved and other advantageous results are obtained.

Variations or modifications to the subject matter of this invention may occur to those skilled in the art upon reviewing the invention as described herein. Such variations or modifications, if within the spirit of this invention, are intended to be encompassed within the scope of any claim to patent protection issuing upon this development. The description of the preferred embodiment set forth herein is done so principally for illustrative purposes only.

I claim:

1. In a butterfly valve for insertion between a pair of spaced flanges in a fluid flow passageway, and wherein said valve attains flush alignment with said flanges to maintain contiguity and uninterrupted flow of fluid material therethrough, said valve including a tubular body having a fluid flow chamber therethrough for communication with the fluid flow passageway, said valve including a disc element pivotally mounted within said tubular body to open and close the fluid flow chamber in said tubular body for open and closed communication with the fluid flow passageway, a resilient seal surrounding the fluid flow chamber of said tubular body and including an inner wall integrally connected to spaced and opposed outer walls, the inner wall of said resilient seal being configured and dimensioned to engage and seal the disc element along its outer periphery when the disc element closes the fluid flow chamber in said tubular body, said spaced and opposed outer walls of said resilient seal having inner wall surfaces directed towards each other and disposed for complimentary engagement and retention by a dovetail extension projecting from an inner portion of said tubular body, said dovetail extension forming reentrant angles for reception of said inner wall surface of the seal, said inner wall surfaces of the opposed outer walls of said resilient seal also each spaced from the dovetail extension within its re-entrant angles to define inner recess areas on opposite sides of said dovetail extension, said spaced and opposed outer walls of said resilient seal further each having an outer wall surface which extends beyond the tubular body of said valve for engagement with said one spaced pair of flanges, and said spaced and opposed outer walls and said inner wall of the resilient seal being joined along generally right angled corner areas, whereby upon compression engagement of the outer wall surfaces of said resilient seal by said spaced pair of flanges, said resilient seal will be compressed and will flow at least partially into said re-entrant angles of the inner recess areas and also allow the inner wall thereof to be deflected inwardly for a tighter seal with said disc element, while maintaining said generally right angled corner areas for contact engagement with said spaced pair of flanges about the fluid flow passageway.

2. The valve as defined in claim 7 wherein during seal installation only a part of the inner wall surface of said spaced and opposed outer walls of said resilient seal along its free outer ends are spaced from the dovetail extension to define inner recess areas formed at the re-entrant angles on opposite sides of said dovetail extension of the valve tubular body.

3. The valve defined in claim 7 wherein said generally right angled corner areas engage said spaced pair of flanges in compression line contact engagement to maintain flush alignment therewith and to eliminate any openings therebetween.

4. The valve as defined in claim 3 wherein said spaced and opposed outer walls integrally connect said inner wall of said resilient seal in a flush, right angled intersection to define said right angled corner areas.

5. The valve as defined in claim 7 wherein one of said flanges is connected to a hopper truck and the other flange is connected to a tee pipe.

6. In an industrial butterfly valve of the type including a disc valve pivotally mounted within a tubular housing through which material flows, said tubular housing having a flow chamber provided approximately centrally therethrough, said butterfly valve being located between spaced flanges provided within a material flow line, said flow line having a passageway therethrough and through which material flows as it also passes through the flow chamber of the tubular housing, said butterfly valve incorporating a pivot stem supporting said disc valve for its pivotal movement between the open and closed positions, and pivot mounts in the form of apertures arranged diametrically of and within said tubular housing to mount for pivotal movement the stem and disc valve, said stem extending from opposite edges of the disc valve and pivotally mounted to said housing within its apertures, bushings provided around said stem and upon its extension from said disc valve and mounting said disc valve and supported stem for pivotal movement within said tubular housing, said housing apertures being counterbores to facilitate the pivot of said disc valve and its stem within said tubular housing between its open material flowing position to its closed position impeding the flow of any material therethrough, said housing apertures communicating with said flow chamber, one of said counterbores opening interiorly of said tubular housing and being in open communication with said flow chamber, the other of said counterbores opening exteriorly of said tubular housing, each bushing comprising an annulus, formed of a polymer, and provided for reducing the friction against the stem during its pivotal movement while also being corrosion resistant, a resilient seal surrounding said flow chamber and cooperating with the disc valve when arranged in its closed position to seal off the flow chamber against passage of any materials. therethrough, said resilient seal including an inner wall integrally connected to spaced and opposed outer walls, the inner wall of said resilient seal being configured and dimensioned to engage and seal the disc valve along its outer periphery when the disc valve closes the flow chamber in said tubular housing, said spaced and opposed outer walls of said resilient seal having inner wall surfaces directed towards each other and disposed for complimentary engagement and retention by a dovetail extension projecting from an inner portion of said tubular body, said dovetail extension forming re-entrant angles for reception of said inner wall surfaces of the seal, said inner wall surfaces of the opposed outer walls of said resilient seal also each spaced from the dovetail extension within its re-entrant angles to define inner recess areas on opposite outer walls of said resilient seal further each having an outer wall surface which extends beyond the tubular body of said valve for engagement with said one spaced pair of flanges in the material flow line, and said spaced and opposed outer walls and said inner wall of the resilient seal being joined along generally sharp right angled corner areas, whereby upon compression of the outer wall surfaces of said resilient seal by said opposed spaced flanges, said resilient seal will be compressed and will flow at least partially into said inner recess areas and also allow the inner wall thereof to be directed inwardly for a tighter seal with said disc valve, while maintaining said generally right angled corner areas for compressive flush contact engagement with said opposed mounting flanges about the material flow line.

* * * * *

UNITED STATES PATENT AND TRADEMARK OFFICE
CERTIFICATE OF CORRECTION

PATENT NO. : 4,822,001
DATED : April 18, 1989.
INVENTOR(S) : David E. Sisk.

It is certified that error appears in the above—identified patent and that said Letters Patent is hereby corrected as shown below:

Claim 2, line 19, change "7" to ---1---.

Claim 3, line 26, change "7" to ---1---.

Claim 5, line 35, change "7" to ---1---.

Claim 6, column 8, line 5, after being, insert ---counterbored, said bushings tightly fitting within said---.

Claim 6, column 8, line 37, after opposite, insert ---sides of said dovetail extension, said spaced and opposed---.

Signed and Sealed this
Fourteenth Day of November, 1989

*Attest:*

JEFFREY M. SAMUELS

*Attesting Officer*   *Acting Commissioner of Patents and Trademarks*